United States Patent
Kim et al.

(10) Patent No.: US 7,277,406 B2
(45) Date of Patent: Oct. 2, 2007

(54) APPARATUS AND METHOD FOR DISTRIBUTING POWER IN AN HSDPA SYSTEM

(75) Inventors: Hun-Kee Kim, Seoul (KR); Yong-Suk Moon, Songnam-shi (KR); Jae-Seung Yoon, Songnam-shi (KR); Jin-Kyu Choi, Seoul (KR); Noh-Sun Kim, Taejonkwangyok-shi (KR); Jun-Sung Lee, Suwon-shi (KR); Chul-Hong Boo, Sogwipo-shi (KR)

(73) Assignee: Samsung Electronics Co., Ltd. (KR)

( * ) Notice: Subject to any disclaimer, the term of this patent is extended or adjusted under 35 U.S.C. 154(b) by 972 days.

(21) Appl. No.: 10/348,503

(22) Filed: Jan. 21, 2003

(65) Prior Publication Data

US 2003/0137950 A1 Jul. 24, 2003

(30) Foreign Application Priority Data

Jan. 21, 2002 (KR) ...................... 10-2002-0003451

(51) Int. Cl.
*H04B 7/005* (2006.01)

(52) U.S. Cl. ....................... 370/318; 455/522
(58) Field of Classification Search ................ 455/522; 370/342, 318, 355, 349
See application file for complete search history.

(56) References Cited

U.S. PATENT DOCUMENTS

| | | | |
|---|---|---|---|
| 5,799,013 A * | 8/1998 | Seshadri et al. | 370/342 |
| 5,991,618 A * | 11/1999 | Hall | 455/425 |
| 6,044,073 A * | 3/2000 | Seshadri et al. | 370/342 |
| 6,385,462 B1 * | 5/2002 | Baum et al. | 455/522 |
| 6,704,579 B2 * | 3/2004 | Woodhead et al. | 455/522 |
| 6,876,866 B1 * | 4/2005 | Ulupinar et al. | 455/522 |
| 2002/0193133 A1 * | 12/2002 | Shibutani | 455/522 |
| 2003/0114127 A1 * | 6/2003 | Baldwin | 455/245.1 |
| 2003/0128658 A1 * | 7/2003 | Walton et al. | 370/208 |
| 2003/0139196 A1 * | 7/2003 | Medvedev et al. | 455/522 |

FOREIGN PATENT DOCUMENTS

WO WO 00/38351 6/2000

OTHER PUBLICATIONS

European Search Report dated May 14, 2003, issued in a counterpart application, namely, Appln. No. 03001259.5.
Chung, Y et al., "An Efficient Reverse Link Data Rate Control Scheme for 1xEV-DV System", VTC Fall 2001, IEEE 54th. Vehicular Technology Conference, Oct. 7-11, 2001, pp. 820-823.
Love R. et al., "High Speed Downlink Packet Access Performance" VTC Fall 1999. IEEE VTS 50th. Vehicular Technology Conference, Sep. 19-22, 1999, pp. 2234-2238.
Lu, Y et al., "Integrating Power Control, Error Correction Coding, and Scheduling for a CDMA Downlink System," IEEE Journal on Selected Areas in Communications, vol. 17, No. 5, May 1999, pp. 978-988.

* cited by examiner

*Primary Examiner*—Kwang Bin Yao
*Assistant Examiner*—Andrew Lai
(74) *Attorney, Agent, or Firm*—The Farrell Law Firm, P.C.

(57) ABSTRACT

A method and an apparatus for redistributing differentiated power for transmitting high speed packet data according to UEs in high speed packet data transport system. The method and apparatus redistribute powers, which have been already assigned in order to transmit the high speed packet data, thereby improving the performance of the system.

12 Claims, 5 Drawing Sheets

APPARATUS AND METHOD FOR DISTRIBUTING POWER IN AN HSDPA SYSTEM

PRIORITY

This application claims priority to an application entitled "Apparatus and Method for Distributing Power in HSDPA System" filed in the Korean Industrial Property Office on Jan. 21, 2002 and assigned Ser. No. 2002-3451, the contents of which are hereby incorporated by reference.

BACKGROUND OF THE INVENTION

1. Field of the Invention

The present invention relates generally to a method and an apparatus for transmitting a high speed packet data in a CDMA mobile communication system, and more particularly to a method and an apparatus for differentiated power distribution in high speed packet transmission.

2. Description of the Related Art

Like other kinds of channels, channels for high speed packet transport employ channelization codes in order to maintain their independence. However, from among channelization codes being used, the channelization codes used by the channels for high speed packet transport utilize shorter codes, that is, codes having smaller spreading factors (for example, spreading factors of not higher than 32), than those for the other channels. Further, in high speed packet transport, a high order modulation scheme is employed in order to increase data transport speed of the entire system. Therefore, the high speed packet transport employs link adaptation techniques, which are different from those in 2nd generation radio communication systems employing a fixed modulation scheme.

In general, mobile communication systems employ power control technologies to effectively use radio resources. 2nd or 3rd generation mobile communication systems employ especially fast power control technologies. Mobile communication systems for high speed packet transport employ an Adaptive Modulation and Coding Scheme (hereinafter, referred to as "AMCS") for effective assignment of radio resources, in contrast to 2nd generation mobile communication systems employing a fixed coding rate and modulation scheme.

Power control technology implies a technology of controlling transport power of a node B or each User Equipment (hereinafter, referred to as "UE"), enabling all UEs to receive uniform service from the same node B. In other words, the power control enables a UE having a relatively bad channel condition to use a transport power higher than a transport power used by a UE having a relatively good channel condition, so that signals transmitted from all UEs can reach a node B with uniform power level. The node B enables all UEs to receive signals with uniform power by individually determining the transport power of the signals in consideration of the channel condition of each UE. In this case, the channel condition may depend on a distance between the node B and each UE. For example, the UE having a relatively bad channel condition may be a UE located far from the node B, and the UE having a relatively good channel condition may be a UE located adjacent to the node B.

Next, AMCS is a technology of modifying the coding rate and modulation scheme of a UE as a downlink condition changes. In the AMCS, each UE periodically checks the downlink condition and reports Channel Quality Information (hereinafter, referred to as "CQI") determined from the checking, to the node B. The node B estimates the downlink condition for the corresponding UE by means of the CQI, and determines the proper coding rate and modulation scheme for the corresponding UE on the basis of the estimated downlink condition. The determination of coding rate and modulation scheme is usually carried out by Modulation and Coding Scheme (hereinafter, referred to as "MCS") levels, which are determined by the CQI. For high speed packet transport, High Speed Downlink Packet Access (hereinafter, referred to as "HSDPA") and 1X-EVDV have been proposed until recently. In the HSDPA and 1X-EVDV, modulation schemes of QPSK, 8PSK, 16QAM, and 64QAM are being discussed and coding rates of ½ and ¾ are being considered for AMCS. Therefore, in a system employing the AMCS, relatively high-order modulation schemes of 16QAM and 64QAM and a relatively high coding rate of ¾ are applied to UEs using good quality channels, such as UEs located adjacent to a node B. In contrast, relatively low-order modulation schemes of 8PSK and QPSK and a relatively low coding rate of ½ are applied to UEs using bad quality channels, such as UEs located at boundary regions between cells.

The two technologies described above, which are the power control and the AMCS, are different types of link adaptation techniques and are independently applied to a mobile communication system.

FIG. 2 is a block diagram illustrating a conventional transmission apparatus employing an AMCS for high speed packet transport. Referring to FIG. 2, a controller 210 receives information about a downlink condition from each UE and determines a modulation scheme and a coding rate for each UE on the basis of the information, so that data to be transmitted to the corresponding UE can be encoded and modulated by means of the determined modulation scheme and coding rate. In other words, the better the downlink condition is, the higher-order the modulation scheme and the higher the coding rate are, as assigned by the controller 210. In contrast, the worse the downlink condition is, the lower-order the modulation scheme and the lower the coding rate are, as assigned by the controller 210. Coding and modulation units 220 and 230 receive corresponding user data, encode and modulate the user data by means of the coding rate and modulation scheme determined by the controller 210, and then output modulation symbol arrays according to UEs. Then, the modulation symbol arrays are input to a demultiplexer (DEMUX) 240. Under the control of the controller 210, the demultiplexer 240 distributes the modulation symbol arrays corresponding to the number of channels, which will be used. That is, the demultiplexer 240 separates the output of the coding and modulation units 220 and 230 according to the number of codes assigned to each UE. In the embodiment illustrated in FIG. 2, M number of modulation symbol arrays according to UEs are distributed to n number of channels. In this case, it is preferred that n, representing the number of channels, is larger than or equal to M, representing the number of UEs or users. The modulation symbol arrays, which are divided according to the channels, are inputted to corresponding spreaders 250-1, 250-2, . . . , and 250-n, and are spread into corresponding channelization codes by the corresponding spreaders 250-1, 250-2, . . . , and 250-n. The assignment of codes to the respective UEs is carried out according to a determination of an upper scheduler or a code assignment controller (not shown). The signals having been spread with the N channelization codes $W_1$ to $W_n$ are added in an adder 260 that thus outputs one signal array. The signal array output from the adder 260 is gain-compensated with power having a usable magnitude in a power gain unit 270 and is then outputted. In conclusion, in the conventional transmission apparatus, power is uniformly distributed according to the same gain compensation for each channel.

When employing the AMCS described above, the magnitudes of assigned powers are different according to MCS levels. This difference will be described hereinafter with reference to FIG. 3, which illustrates an example of coding rates and modulation schemes determined by MCS levels of UEs. In this case, the MCS levels are classified into four stages.

Referring to FIG. 3, each MCS level has a predetermined assignment range corresponding to the channel condition, which has an upper critical point and a lower critical point. For example, reference numeral 301 in FIG. 3 designates an upper critical point of an MCS level having a modulation scheme of 64QAM and a coding rate of ¾, and reference numeral 303 designates a lower critical point of the MCS level (in fact, the upper critical point need not be considered when the 64QAM is the highest-order modulation scheme). Of course, when the MCS level having the modulation scheme of 16QAM and the coding rate of ¾ in FIG. 3 is taken into consideration, the reference numeral 303 designates an upper critical point of the MCS level.

Since each MCS level has a specific modulation scheme and a specific coding rate, a modulation scheme and a coding rate which will be applied to a specific UE are determined by the MCS level. That is, the higher the order of the modulation scheme and the coding rate are, the higher the MCS level is. In contrast, the lower the order of the modulation scheme and the coding rate are, the lower the MCS level is. The MCS level is determined by a channel condition, i.e., a Signal to Noise Ratio (hereinafter, referred to as "SNR"). Therefore, the best channel condition, that is, the best SNR is required to employ the highest-order modulation scheme and the highest coding rate corresponding to the uppermost MCS level from among the MCS levels. In FIG. 3, UE #1 310 and UE #2 320 to which the modulation scheme of 64QAM and the coding rate of ¾ are applied require the best SNR. That is, a modulation scheme and a coding rate corresponding to each MCS level are applied to UEs, which can meet the requirement of each MCS level. When the MCS levels have been determined, powers are assigned according to the determined MCS levels. Therefore, powers having the same magnitude are assigned to UEs (or channels), which have been determined as having the same MCS level, even though they require powers of different magnitudes. In this case, the power for high speed packet transport, which can be assigned to the UEs, has a value obtained by subtracting a power arranged for voice service from the total power, which can be used by a node B. The assigned power is used as a parameter for controlling the channel condition. That is, the channel condition corresponding to a predetermined channel can be improved by increasing the power assigned to the predetermined channel. In contrast, the channel condition corresponding to a predetermined channel can be degraded by decreasing the power assigned to the predetermined channel.

In applying the AMCS as described above, the MCS level for each UE is determined according to the channel condition. In the case of the HSDPA being currently discussed, the MCS levels are classified into stages from at least four to at most eight. The AMCS in which the modulation schemes and the coding rates are different according to the channel conditions can be applied best when one channelization code is assigned for a fixed duration. However, the high speed packet transmission system employing the AMCS described above use both code division and time division in order to simultaneously support service for many UEs. This means that a plurality of channelization codes may be assigned instead of a single channelization code. The number of assignable channelization codes plays an important role in determining the number of UEs capable of simultaneously accessing. This implies that multiple UEs can simultaneously receive packets through different channelization codes. In this case, one or more channelization codes may be assigned to one UE for a fixed duration. When a plurality of channelization codes are assigned for a fixed duration as described above, the AMCS cannot effectively use the resources. That is, although the MCS level is determined corresponding to the channel condition and each of different channelization codes, an optimum channel condition cannot be employed due to the limited MCS levels.

In more detail, each MCS level has an upper critical point and a lower critical point, and the same MCS level is given to UEs having channel conditions between the two critical points. Therefore, even the UEs (UE#1 and UE#2 in FIG. 3) having channel conditions with a relatively large difference may be provided with the same MCS level, and even the UEs (UE#2 and UE#3 in FIG. 3) having channel conditions with a relatively small difference may be provided with different MCS levels. For example, referring to FIG. 3, the UE#2 320 having a channel condition slightly exceeding a lower critical point 303 and the UE#1 310 having a channel condition adjacent to an upper critical point 301 are provided with the same MCS level, although they have considerably different channel conditions. In contrast, referring again to FIG. 3, the UE#2 320 having a channel condition slightly exceeding a lower critical point 303 and the UE#3 330 having a channel condition adjacent to the lower critical point 303 are provided with different MCS levels, although they have approximate channel conditions. Therefore, the UE#2 320 provided with the same MCS level as that of the UE#1 310 has a higher probability of generating errors in comparison with the UE#1 310, so that the UE#1 310 has a higher probability of requiring retransmission. Further, the UE#2 320 provided with an MCS level higher than that of the UE#3 330 has a higher probability of generating errors in comparison with the UE#3 330.

In the conventional transmission apparatus employing the AMCS, since each MCS level has too broad a range, as described above, the same power may be assigned even to UEs having channel conditions which are much different from each other, thereby deteriorating the transport power. Moreover, different MCS levels may be provided to UEs having channel conditions, which are only slightly different from each other. This problem can be overcome by adjusting powers assigned to UEs provided with MCS levels. That is, surplus powers of UEs having more assigned powers than needed can be redistributed to UEs having assigned powers insufficient for the services required by the corresponding MCS levels provided with the assigned powers, so as to solve this problem.

SUMMARY OF THE INVENTION

Accordingly, the present invention has been designed to solve the abovementioned problems occurring in the prior art, and an object of the present invention is to provide a method and an apparatus, which can redistribute powers of UEs having relatively good channel conditions to UEs having relatively bad channel conditions.

It is another object of the present invention to provide a method and an apparatus, which distribute different powers according to necessities in a high speed packet transmission system.

It is another object of the present invention to provide a method and an apparatus, which perform differentiated power distribution in consideration of various conditions in applying an AMCS.

It is another object of the present invention to provide a method and an apparatus, which applies an AMCS by performing differentiated power distribution in consideration of conditions, which include channel conditions, transmission types, handover states, priorities of packets, and differentiated quality control.

It is still another object of the present invention to provide a method and an apparatus, which perform differentiated power distribution simultaneously while applying an AMCS.

It is still another object of the present invention to provide a method and an apparatus, which perform differentiated power distribution to UEs classified by modulation and coding levels in applying an AMCS.

In order to accomplish the above and other objects, there is provided a method of distributing power in a CDMA mobile communication system in which a node B transmits high speed packet data to UEs located in an area occupied by the node B, the area being divided into a plurality of channel condition areas, each of the channel condition areas having an upper critical value and a lower critical value, each of the channel condition areas containing a plurality of UEs which receive the high speed packet data with the same coding rate and in the same modulation scheme, the method comprising the steps of: lowering a first power for transmitting high speed packet data to UEs having channel conditions adjacent to the upper critical value of each of the channel condition areas by a surplus power; and compensating for a second power for transmitting high speed packet data to UEs having channel conditions adjacent to the lower critical value of each of the channel condition areas by the surplus power.

In accordance with another aspect of the present invention, there is provided an apparatus for distributing power in a CDMA mobile communication system in which a node B transmits high speed packet data to UEs located in an area occupied by the node B, the area being divided into a plurality of channel condition areas, each of the channel condition areas having an upper critical value and a lower critical value, each of the channel condition areas containing a plurality of UEs which receive the high speed packet data with the same coding rate and in the same modulation scheme, the apparatus comprising: a power distributing unit for generating gain compensation values, to lower a first power for transmitting high speed packet data to UEs having channel conditions adjacent to the upper critical value of each of the channel condition areas by a surplus power, and to compensate for a second power for transmitting high speed packet data to UEs having channel conditions adjacent to the lower critical value of each of the channel condition areas by the surplus power; and gain compensation units for compensating for signals corresponding to the channels for transmitting the high speed packet data to the UEs by corresponding gain compensation values.

The present invention provides a method and an apparatus for applying power distribution together with an AMCS. The power distribution in the following description implies a differentiated power assignment according to various conditions including channel conditions proposed by the present invention and is totally different from the existing power control.

In the method and apparatus according to the present invention, the power distribution together with an AMCS is possible, because both time division and code division can be simultaneously carried out, as illustrated in FIG. 1, for the high speed packet transport. That is, although usable power of the transmitter is limited, the limited power can be assigned in an unbalanced way according to channelization codes or UEs in consideration of various conditions of the channelization codes or UEs.

Various conditions that should be considered for the power distribution may include channel conditions, retransmission states, handover states, priorities of packets, differentiated service quality control, etc. "Channel condition" refers to the status of a channel assigned between a node B and each UE. Retransmission is carried out when an error happens when the Hybrid Automatic Retransmission Request (HARQ) technique is employed. "Handover" signifies that a corresponding UE is located at a border area of a cell and needs a shift to another cell. "Priority of packet" refers to importance of each transmitted packet. Finally, "differentiated service quality control" signifies a control for differentiated qualities of high speed packet services provided to UEs.

Hereinafter, the necessity for the power distribution in relation to each condition described above will be described in detail.

Power Distribution in Consideration of Channel Conditions

In employing the AMCS, the MCS level of each channel is determined according to the channel condition. In the case of the HSDPA being currently discussed, the MCS levels are classified into stages from at least four to at most eight. FIG. 3 illustrates an example of MCS levels, which are classified based on combination of the modulation scheme and the coding rate. The higher each MCS level is, the higher the order of the applied modulation scheme (e.g., 16QAM or 64QAM) and the applied coding rate are.

Each MCS level has a predetermined assignment range, which has an upper critical, point and a lower critical point. The same MCS level is given to a UE or UEs having channel conditions between the two critical points. Therefore, a UE having a channel condition slightly exceeding the lower critical point has a higher probability of generating errors, thereby having a higher probability of requiring retransmission, in comparison with another UE having a channel condition adjacent to the upper critical point. In this case, a surplus power of the UE having a relatively good channel condition can be redistributed to the UE having a relatively bad channel condition, so as to improve the communication quality of an entire system. Further, different MCS levels may be given to UEs having similar channel conditions due to only a slight difference between the channel conditions. As a result, a UE or UEs provided with a higher MCS level may have a higher probability of generating errors than a UE or UEs provided with a lower MCS level. In this case, a portion of a power of a UE having a channel condition adjacent to an upper critical point of an MCS level (having a relatively good channel condition) can be redistributed to a UE provided with the same or different MCS level, so as to improve the communication quality of an entire system. In conclusion, the power distribution compensates for the impossibility of and enables precise power control for a UE or UEs even when each MCS level has a broad range in the AMCS. In other words, surplus power of UEs or channels adjacent to the upper critical point of each MCS level can be assigned to UEs or channels adjacent to the lower critical point of the MCS level, so as to realize the precise power control.

Power Distribution in Consideration of Initial Transmission and Retransmission

UEs currently receiving data packets can be classified into UEs in initial transmission and UEs in retransmission. When an error has occurred in an initially transmitted data packet, it is required to retransmit the data packet in order to compensate the erroneous packet. In this case, the retransmission has a higher success rate than that of the initial transmission due to the combination of the initially transmitted packet and the retransmitted packet. Also, a priority or weight may be given to the initial transmission and the retransmission, so that powers assigned to the initial transmission and the retransmission can be controlled.

Power Distribution in Consideration of Handover

Power can be assigned in consideration of the handover states of UEs. The handover is a phenomenon occurring when an electric field intensity of a currently accessing node B is lower than that of an adjacent node B. It is preferred that a UE in a handover situation as described above carries out the handover after receiving a data packet transmitted from the servicing node B. Therefore, a higher power is assigned to a UE located in a handover area than that assigned to another UE located out of the handover area. This reduces the probability of requiring retransmission of a data packet further to an already transmitted data packet, thereby enabling the handover to be performed after the reception of the data packet is completed. Specifically, power distribution as described above is more often required when the handover is necessary in a retransmission situation. This is because, in order to perform the handover in a situation where the retransmission is necessary, a node B to which a corresponding UE will move should not only information about the corresponding UE but also information in relation to the retransmission.

Power Distribution in Consideration of Priorities of Packets

Power can be distributed according to priorities of packets. 3rd generation high speed packet transmission systems being currently discussed are developing at a high speed. The developed technologies pay much attention to technologies considering priorities of bits or symbols in pursuit of improvements in aspects of Bit Error Rate (BER), Frame Error Rate (FER), and Throughput. This is because pieces of data do not always have the same priority. For example, in a channel encoder that generates and transports a parity bit in addition to information bits (systematic bits) in order to compensate for error in noise environments, it is natural that the information bits are more important than the parity bit. Further, it can be said that a control bit enabling the information bits to be received has a relatively high importance. The bits classified in this way may be transmitted either in the same packet or different packets. In this case, powers may be distributed in an unbalanced way in consideration of priorities of information contained in each packet. For example, when a node B simultaneously transmits packets to two UEs, one packet may carry only a control bit or information bits of the first UE while the other packet carries only a parity bit of the second UE, thereby enabling a relatively high power to be assigned to the channel of the first UE.

Power Distribution in Consideration of Differentiated Service Qualities

Differentiated service quality control may be considered. No current UE considers the priority or quality of the service. However, UEs should have different priorities or qualities according to types of services. That is, a high speed radio packet system should provide services having qualities of various grades. It is necessary to differentiate the urgent channel of the current wire or radio communication, such as the 119 channel, which is a Korean urgent service channel. It is natural to manage such urgent channels as described above with differentiated qualities. Further, differentiated quality services may be provided according to billing systems. That is, a relatively high power may be assigned to a UE that pays relatively large fee for a higher class service. This unbalanced power distribution enables qualities of services to be easily classified into various grades.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. In the following description of the present invention, a detailed description of known functions and configurations incorporated herein will be omitted when it may make the subject matter of the present invention rather unclear.

Figure 1:
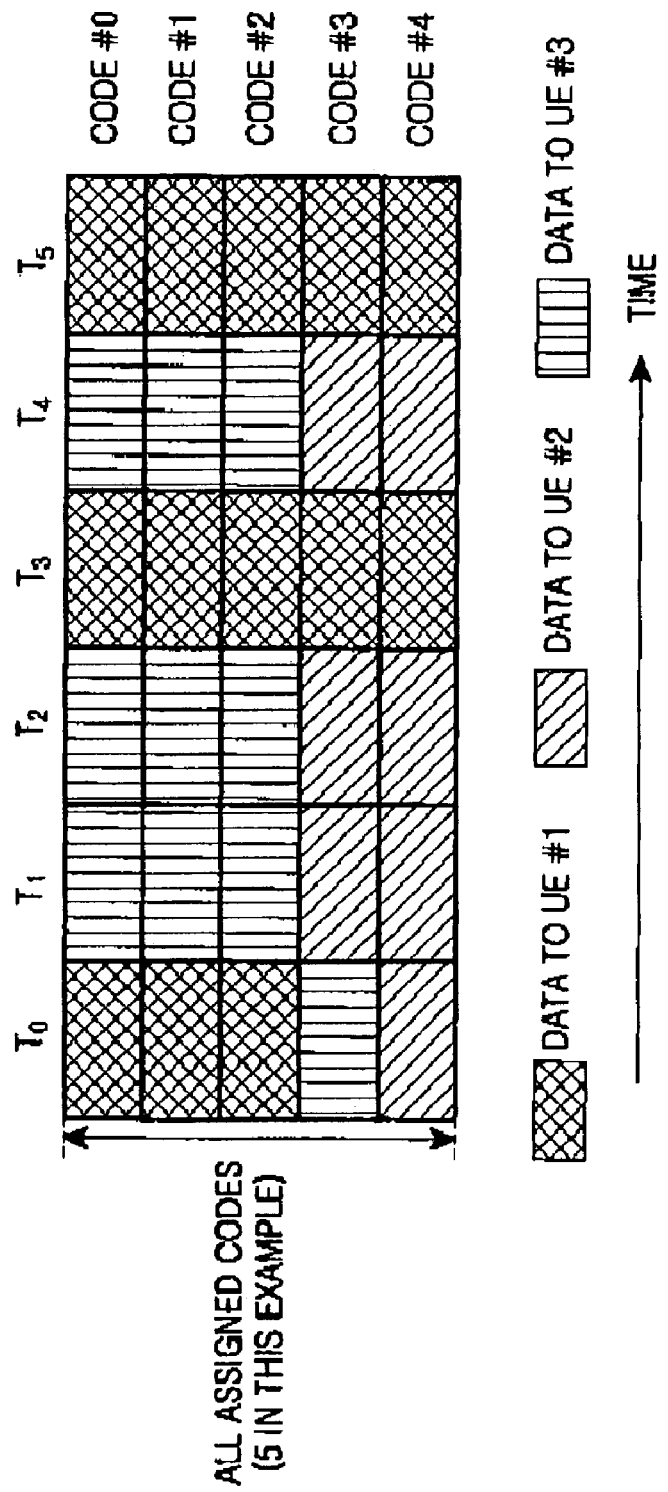
FIG. 1 illustrates an example in which multiple UEs receive high speed packet data service by time division and code division.
Figure 2:
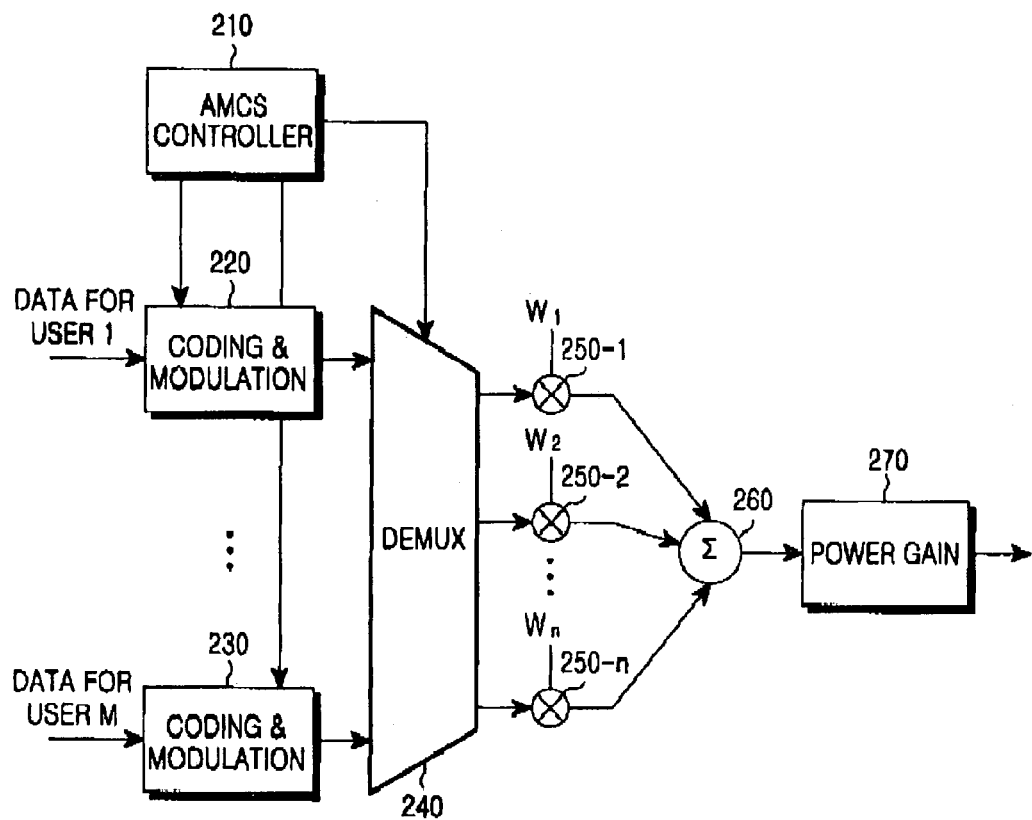
FIG. 2 is a block diagram illustrating a conventional transmission apparatus employing an AMCS for high speed packet transport.

FIG. 1 illustrates an example of time division and code division for five channelization codes and three UEs, which enable various UEs to receive high speed packet data service.

In FIG. 1, each row represents code division and each column represents time division. In the first column $T_0$, UE#1 uses three channelization codes (code #0, #1, and #2), and both of UE#2 and UE#3 use one channelization code each (code #4 and #3, respectively). In the second, third, and fifth columns $T_1$, $T_2$, and $T_4$, no channelization code is assigned to UE#1, two channelization codes (code #3, and #4) are assigned to UE#2, and three channelization codes (code #0, #1, and #2) are assigned to UE#3. In the fourth and sixth columns $T_3$ and $T_5$, all assignable channelization codes are used by UE#1. As illustrated, no channelization code, one channelization code, or a plurality of channelization codes may be assigned to each UE during the same time interval according to the time division.

In the embodiments of the present invention which will be specifically described hereinafter, powers are first assigned to MCS levels given to the channelization codes or UEs, and then the powers assigned according to the channelization codes or UEs are redistributed.

Figure 4:
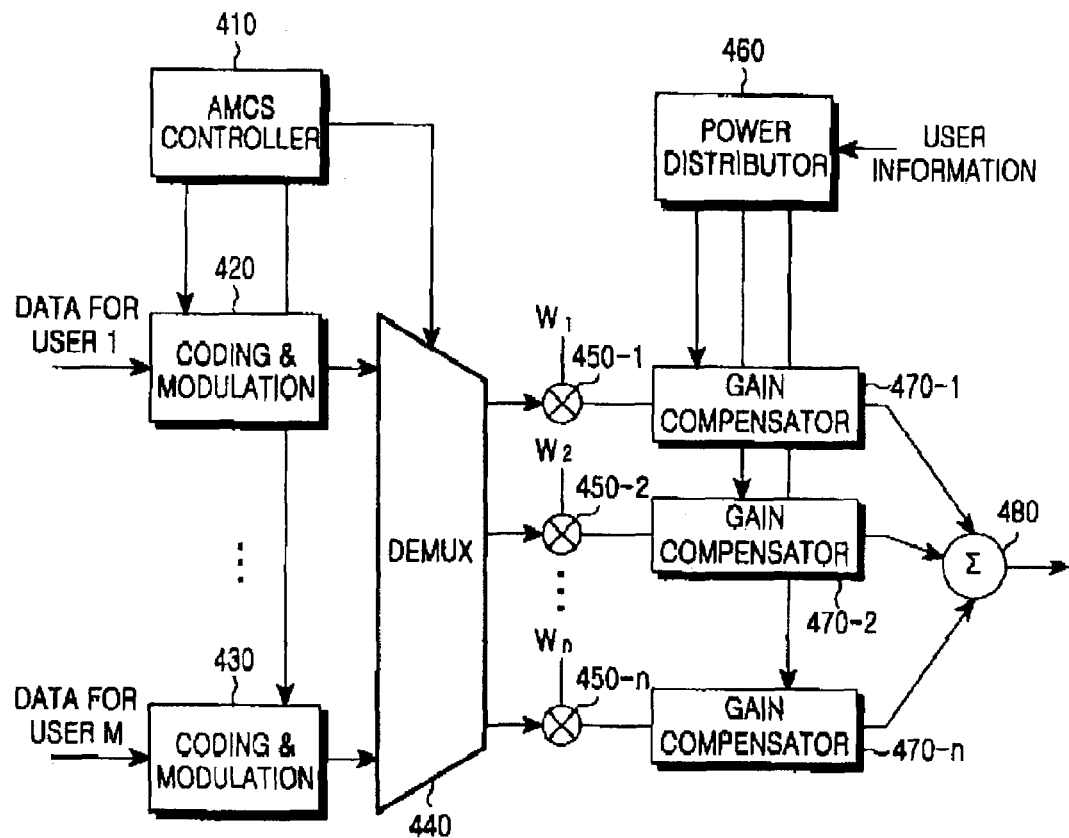
FIG. 4 is a block diagram illustrating a transmission system of a mobile communication system providing a high speed packet data service according to an embodiment of the present invention.

FIG. 4 is a block diagram illustrating a transmission system of a mobile communication system providing a high speed packet data service according to an embodiment of the present invention. Referring to FIG. 4, a controller 410 measures the conditions of channels for UEs currently providing a high speed packet data service, and gives an MCS level to each UE based on the channel condition of the UE. The channel condition, which represents a downlink state, can be measured by means of CQI information reported by the UE or by collecting power control commands generated according to UEs for power control. The better the channel condition is, the higher the MCS level given by the controller 410 is. In contrast, the worse the channel condition is, the lower the MCS level given by the controller 410 is. When the MCS levels have been given to the channels or UEs, coding rates and modulation schemes to be used for the channels or UEs are determined. Therefore, the controller 410 controls coding and modulation units 420 and 430 according to the channels or UEs by means of the determined coding rates and modulation schemes. The coding and modulation units 420 and 430 receive data according to the UEs, which should be transmitted, encode the data by means of the coding rate, and then modulate the data by means of the modulation scheme. Modulation symbol arrays according to UEs, which are output from the coding and modulation units 420 and 430, are distributed according to channels assigned by a demultiplexer 440. If the number of UEs currently providing the high speed packet data service is equal to the number of assigned channels, the demultiplexer 440 is not necessary. Meanwhile, the demultiplexer 440 is controlled according to the number of the UEs and the number of the channels by the controller 410. The modulation symbol arrays distributed according to the channels are input to corresponding spreaders 450-1, 450-2, ..., and 450-n, respectively. The spreaders 450-1, 450-2, ..., and 450-n spread and output the modulation symbols with the assigned channelization codes $W_1$, $W_2$, ..., and $W_n$, respectively.

A power distributor 460 distributes power to each channel within the range of an entire power that can be used for high speed packet data service. The power distributor 460 refers to information for each UE in distributing power to each channel. In this case, the information for each UE includes an MCS level given by the controller 410 and various set conditions. First, the power distributor 460 assigns power for each UE according to the MCS level given by the controller 410. That is, the power distributor 460 assigns a relatively high power to a UE provided with a high MCS level, assigns a relatively low power to a UE provided with a low MCS level, and assigns the same power to UEs provided with the same MCS level. Thereafter, the power distributor 460 redistributes the power having been assigned to each UE on the basis of various conditions. That is, the assigned power of a UE, which includes a surplus power, is lowered by the surplus power. In contrast, the surplus power is additionally distributed to a UE of which the assigned power is insufficient. However, when the power distribution to each UE according to the given MCS levels has been already carried out in a previous stage, the power distributor 460 performs only the redistribution of the assigned power according to said various conditions. Said various conditions include downlink channel conditions, retransmission states, handover states, priorities of packets, priorities of users, etc. The power distributor 460 may meet either only one condition or a plurality of conditions from among said various conditions. In this case, a service provider can determine the condition or conditions, which the power distributor 460 should meet. Therefore, the power distributor 460 distributes the power in an unbalanced way to each UE on the basis of said various conditions. The power distributed by the power distributor 460 is a transmission power in a transmitting apparatus of a node B. In contrast, a transmission power in each UE is a power estimated by the UE. Therefore, even when a node B distributes the transmission power according to the proposal by the present invention, the UE has no increased difficulty in estimating the transmission power, so that there is no factor deteriorating the performance of the system. Embodiments of the present invention in which power is redistributed according to each UE on the basis of said various conditions will be described later in detail. The transmission powers having been redistributed by the power distributor 460 are provided to gain compensators 470-1 to 470-n. The power distributor 460 may provide power gain values, so that gain compensation can be carried out according to the redistributed transmission powers for each channel by the gain compensators 470-1 to 470-n.

The gain compensators 470-1 to 470-n compensate and output gain for each channel signal from the spreaders 450-1 to 450-n according to the assigned powers or power gain values provided by the power distributor 460. The channel signals gain-compensated for each channel are added together to form a single channel signal by an adder 480.

Hereinafter, redistribution of transmission power of a node B on the basis of said various conditions according to embodiments of the present invention will be described in detail.

The differentiated power redistribution by the downlink channel conditions for each UE is carried out as follows. In order to facilitate understanding, the following description will be based on an assumption that one UE occupies only one channel. However, one UE can occupy even a plurality of channels, in which case it is natural that the differentiated power redistribution can be carried out for each channel.

For the differentiated power redistribution, the node B needs to receive information by which it can estimate a condition of each channel from each UE. A representative way of estimating a downlink channel condition is a method using a Carrier-to-Interference Ratio (CIR). The method in which a node B estimates a downlink channel condition by means of a CIR for each UE is already known technology, so a detailed description of the technology will be omitted here. Condition data of downlink channels estimated for respective channels are provided to the power distributor 460. Then, the power distributor 460 performs the power redistribution for each channel by means of the condition data. For example, the power distributor 460 assigns a portion of the power having been assigned to a UE having a good channel condition additionally to the power having been assigned to a UE having a bad channel condition, thereby improving the communication quality of all of the UEs. Usually, the channel condition can be improved by increasing the assigned power. For this reason, power is redistributed to UEs provided with the same MCS level but having different channel conditions, so that the UEs provided with the same MCS level can have similar channel conditions. The channel distributor 460 determines if each UE has a proper channel condition corresponding to the given MCS level, and redistributes the power to a UE having an improper channel condition. The power redistribution reduces a power of a UE having a relatively good channel condition within a range of a channel condition required by a given MCS level, so that the UE can have an average channel condition in the corresponding MCS level.

Figure 3:
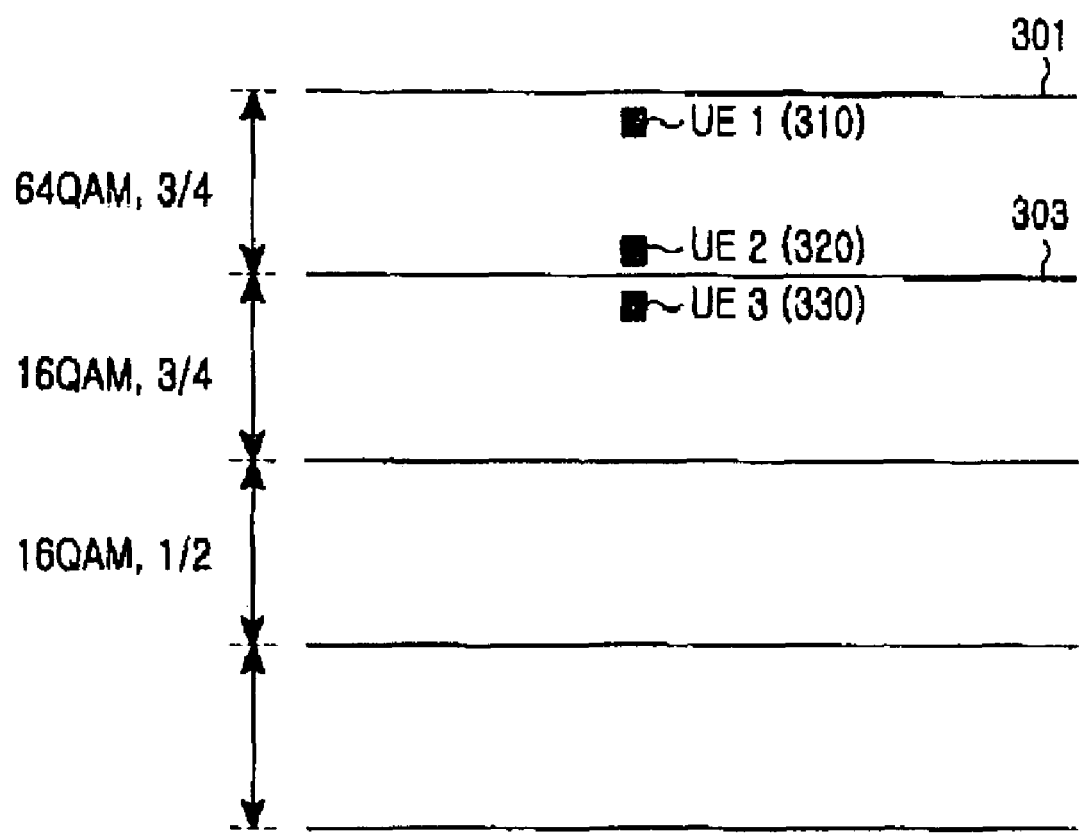
FIG. 3 illustrates an example in which MCS levels are given to UEs according to their channel conditions by applying an AMCS.

In contrast, the power redistribution increases a power of a UE having a relatively bad channel condition within a range of a channel condition required by a given MCS level, so that the UE can have an average channel condition in the corresponding MCS level. In this case, the reduced power and the increased power should be proportional to each other. For example, referring to FIG. 3, it can be said that UE#1 310 and UE#3 330 have relatively good channel conditions in each MCS given to them and UE#2 320 has relatively bad channel condition in a given MCS. Therefore, redistribution of power is necessary to enable UE#1 310, UE#2 320, and UE#3 330 to have average channel conditions in each given MCS level. That is, the powers assigned to UE#1 310 and UE#3 330 are reduced by a surplus power, and the power assigned to UE#2 320 is increased by a required power. The surplus power signifies a power which should be reduced in order to lower the channel conditions of UE#1 310 and UE#3 330 to average channel conditions in the given MCS levels. The required power signifies a power that should be added in order to elevate the channel condition of UE#2 320 to an average channel condition in the given MCS level. In this case, as a result of the power distribution, all UEs need not have average channel conditions without fail, but it will do if UEs provided with the same MCS level have similar channel conditions.

Further, the surplus power and the required power need not always be equal to each other. When the surplus power and the required power have been determined in the way described above, the power distributor 460 estimates gain compensation values for respective channel by means of the surplus power and the required power and provides the gain compensation values to the gain compensators 470-1 to 470-n. The gain compensation values for respective channels are different from each other, so that different powers can be distributed according to channel conditions to each channel signal.

The differentiated power redistribution according to the transmission types classified into initial transmission and retransmission is carried out as follows. In the following description, when an error occurs in an initially transmitted data packet, retransmission of the data packet is required in order to compensate for the erroneous data packet. In this case, it is assumed that the same data packet is transmitted in the initial transmission and the retransmission, in order to facilitate understanding of the following description.

For the retransmission, it is required that a node B can confirm whether data to be transmitted for each channel is initially transmitted data or retransmitted data. The information about the transmission type for each channel is provided to the power distributor 460. Then, the power distributor 460 performs the power redistribution for each channel by means of the transmission type. For example, the power distributor 460 assigns a portion of the power having been assigned to a channel carrying the retransmitted data additionally to the power having been assigned to a channel carrying the initially transmitted data. That is, the retransmission enables the initially transmitted data packet to be transmitted in a better channel condition than that for the retransmitted data packet. Usually, the channel condition can be improved by increasing the assigned power. The reason of the power redistribution as described above is that the retransmission has a higher success rate than that of the initial transmission as a receiving side combines the retransmitted packet with the previously transmitted packets.

The differentiated power redistribution according to the handover states is carried out as follows. The handover in the following description is a phenomenon occurring when an electric field intensity of a currently accessing node B is lower than that of an adjacent node B.

For the retransmission, it is required that a node B can confirm whether each UE is located in a handover area. The handover state of each UE can be confirmed by a report from each UE. The handover state of each UE is provided to the power distributor 460. Then, the power distributor 460 performs the power redistribution for each channel by means of the handover state. For example, the power distributor 460 assigns a portion of the power having been assigned to a UE located out of a handover area additionally to the power having been assigned to a UE located within the handover area. That is, the retransmission enables the data packet to be transmitted in a better channel condition to the UE located within the handover area than to the UE located out of the handover area. The power redistribution as described above enables a UE located in a handover area to be handed over after receiving all data packets, thereby improving the reception success rate.

The differentiated power redistribution according to the priorities of packets is carried out as follows.

For retransmission, it is required that a node B should previously know the priorities of data packets that will be transmitted. The priorities of packets in the following description can be classified according to types of the data packets. For example, data that is transmitted after being encoded can be classified into information bits (systematic bits) and parity bits. It can be said that the information bits are more important than the parity bits. Further, it can be said that control bits required for receiving data have higher priorities than those of the data. Therefore, the power distributor 460 assigns a portion of the power having been assigned to a channel transporting a data packet having a lower priority additionally to the power having been assigned to a channel transporting a data packet having a higher priority. That is, the retransmission enables the data packet having a higher priority to be transmitted in a better channel condition than the data packet having a lower priority. The power redistribution as described above improves the success rate of receiving data packets having relatively high priorities.

The differentiated power redistribution according to different qualities of services or grades of UEs is carried out as follows.

For retransmission, it is required that a node B should know the grades of UEs and information about qualities of services provided respectively by UEs or channels. The grades of UEs and the information about qualities of services provided respectively by UEs or channels are provided to the power distributor 460. Then, the power distributor 460 performs the power redistribution for each channel by means of the grades of UEs and the information about qualities of services provided respectively by UEs or channels. For example, the power distributor 460 assigns a portion of the power having been assigned to a UE having a lower grade or providing a service with a lower quality additionally to the power having been assigned to a UE having a higher grade or providing a service with a higher quality. That is, the retransmission enables the UE having a higher grade or providing a service with a higher quality to have a better channel condition than that of the UE having a lower grade or providing a service with a lower quality. The power redistribution as described above aims to provide a better channel condition for a service with a higher quality or grade.

A node B may separately manage an additional power that can be assigned to a UE or UEs for providing services with high grades or qualities, so as to additionally redistribute the separately managed power to the UE or UEs in a situation in which the UE or UEs require additional powers.

The differentiated service quality control as described above can be realized not only by the unbalanced power distribution but also by a scheduler. The scheduler determines a sequence of data transmission by all UEs receiving services by code division and time division from a node B. In the differentiated service quality control, more opportunities are provided to UEs receiving services with higher quality, so that data services with high speed or high quality can be realized. However, when the scheduler is a simple scheduler that provides the same opportunity to all UEs, the power distributor 460 performs the differentiated service quality control.

From among various conditions described above, the retransmission state, the priorities of packets, and the differentiated service quality control can be judged by control information of a physical layer or information from an upper layer or MAC (Medium Access Control) layer.

Figure 5:
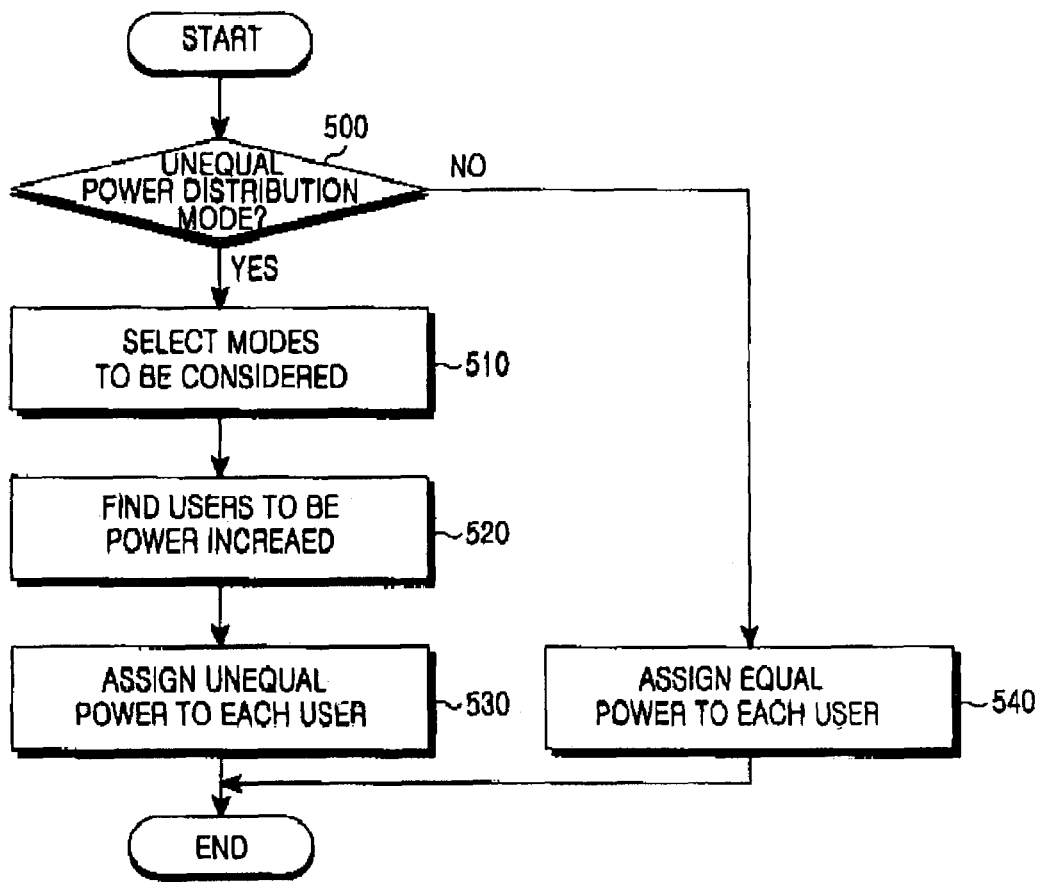
FIG. 5 is a flowchart illustrating power redistribution according to an embodiment of the present invention.

FIG. 5 is a flowchart illustrating a process of power redistribution according to an embodiment of the present invention. Referring to FIG. 5, whether a differentiated power redistribution to each channel or each UE is required is determined in step 500. When a differentiated power redistribution is not required, uniform powers according to given MCS levels are distributed to all channels or UEs currently transmitting data packets in step 540. In contrast, when a differentiated power redistribution is required, at least one condition that will be applied for the differentiated power redistribution is selected in step 510. In step 520, UEs or channels requiring power redistribution are searched by means of the selected condition. When the UEs or channels for power redistribution have been determined, power is redistributed to the UEs or channels by means of the selected condition in step 530. For example, when the power is redistributed according to the channel condition, a surplus power of a UE having a better channel condition from among UEs provided with the same MCS level may be additionally assigned to the power having been assigned to a UE having a worse channel condition. Further, even between UEs provided with different MCS levels, a surplus power of a UE having a channel condition (e.g., SNR or CIR) located near an upper critical point may be additionally assigned to the power having been assigned to a UE having a channel condition located near a lower critical point. The power redistribution can be performed based on the channel conditions and also other conditions described above. Further, the power redistribution can be performed based on combination of at least two conditions described above.

As described above, in the method and apparatus according to the present invention, the limited transmission power can be properly redistributed in consideration of various conditions, thereby improving general performance of a system. Also, the present invention enables the power to be distributed in a differentiated manner according to a channel conditions and also transmission type, a handover state, and a priority of each packet. Moreover, the present invention enables a differentiated service quality control for each user.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of distributing power in a CDMA (Code Division Multiple Access) mobile communication system in which a node B transmits high speed packet data to UEs (User Equipment) using a plurality of MCS (Modulation and Coding Scheme) levels determined in accordance with channel condition, each MCS level having an upper critical point and a lower critical point of the channel condition, the method comprising the steps of:

channelizing a first high speed packet data and a second high speed packet data with corresponding channelization codes;

lowering a first power for transmitting the first channel high speed packet data to UEs having channel conditions adjacent to the upper critical point in a specific MCS level by a surplus power;

compensating for a second power for transmitting the second channel high speed packet data to UEs having channel conditions adjacent to the lower critical point in a specific MCS level by the surplus power; and combining the lowered first channel high speed packet data and the compensated second channel high speed packet data.

2. The method according to claim 1, wherein the surplus power is obtained by subtracting a third power from the first power, the third power being a power required to maintain an average channel condition in a corresponding MCS level to which the UEs belong.

3. The method according to claim 1, wherein the MCS level includes modulation scheme and coding rate.

4. The method according to claim 1, wherein a transmission power for initially transmitted high speed packet data is compensated for by the surplus power.

5. The method according to claim 1, wherein a transmission power for high speed packet data transmitted to UEs located in a handover area is compensated for by the surplus power.

6. The method according to claim 1, wherein a transmission power for the high speed packet data is compensated for by the surplus power, wherein the high speed packet data has a relatively high priority.

7. An apparatus for distributing power in a CDMA (Code Division Multiple Access) mobile communication system in which a node B transmits high speed packet data to UEs (User Equipment) by using a plurality of MCS (Modulation and Codina Scheme) levels determined in accordance with channel condition, each MCS level having an upper critical point and a lower critical point of the channel condition, the apparatus comprising:

at least one spreader for channelizing a first high speed packet data and a second high speed packet data with corresponding channelization codes;

a power distributing unit for controlling gain compensation values, to lower a first power for transmitting the first channel high speed packet data to UEs having channel conditions adjacent to the upper critical point in a specific MCS level by a surplus power, and so as to compensate for a second power for transmitting the second channel high speed packet data to UEs having channel conditions adjacent to the lower critical point in specific MCS level by the surplus power;

at least one gain compensation unit for compensating the first channel high speed packet data and the second channel high speed packet data by corresponding gain compensation values; and an adder for combining the lowered first channel high speed packet data and the compensated second channel high speed packet data.

8. The apparatus according to claim 7, wherein the surplus power is obtained by subtracting a third power from the first power, the third power being a power required to maintaining an average channel condition in a corresponding MCS level to which the UEs belong.

9. The apparatus according to claim 7, wherein the MCS level includes modulation scheme and coding rate.

10. The apparatus according to claim 7, wherein the power distributing unit compensates for a transmission power for initially transmitted high speed packet data by the surplus power.

11. The apparatus according to claim 7, wherein the power distributing unit compensates for a transmission power for the high speed packet data transmitted to UEs located in a handover area by the surplus power.

12. The apparatus according to claim 7, wherein the power distributing unit compensates for a transmission power for the high speed packet data by the surplus power, wherein the high speed packet data has a relatively high priority.

\* \* \* \* \*